United States Patent [19]
Goldstein

[11] Patent Number: 4,608,140
[45] Date of Patent: Aug. 26, 1986

[54] ELECTRODIALYSIS APPARATUS AND PROCESS

[75] Inventor: Arthur L. Goldstein, Weston, Mass.

[73] Assignee: Ionics, Incorporated, Watertown, Mass.

[21] Appl. No.: 743,219

[22] Filed: Jun. 10, 1985

[51] Int. Cl.⁴ .................. C07K 3/14; B01D 13/02; B01D 13/01
[52] U.S. Cl. .................. 204/182.3; 204/182.4; 204/182.6; 204/301
[58] Field of Search .................. 204/182.4, 182.6, 301, 204/182.3

[56] References Cited
FOREIGN PATENT DOCUMENTS
1929117 2/1971 Fed. Rep. of Germany ...... 204/301

*Primary Examiner*—John F. Niebling
*Assistant Examiner*—Terryence Chapman
*Attorney, Agent, or Firm*—Norman E. Saliba

[57] ABSTRACT

Apparatuses and processes are described for transferring electrolytes from one electrolytically conducting solution to another, said apparatus comprising a pair of spaced electrodes; at least one pair of spaced electrolytically conducting barriers between said electrodes, one of said barriers having a transport number for ions of one sign substantially greater than that of said solutions and of the other barrier, means for applying a substantially direct current electrical potential between said electrodes in a direction to cause electrolyte to the transferred out of the space between said barriers; a plurality of fluid permeable tubules between said barriers; means for introducing fluid into at least one end of such tubules; and means for withdrawing fluid from the space between said barriers.

8 Claims, 2 Drawing Figures

4,608,140

ELECTRODIALYSIS APPARATUS AND PROCESS

BACKGROUND OF THE INVENTION

1. Field of the Invention

Electrodialysis has become an accepted process and apparatus for transferring electrolytes from one electrolytically conducting solution to another. The state of the art is well-described in pages 726 through 738, Volume 8, Kirk-Othmer Encyclopedia of Chemical Technology, Third Edition, John Wiley and Sons, New York, 1979. Typically one hundred or more pairs of spaced electrolytically conducting barriers are arrayed between a pair of electrodes. In each pair of barriers, one barrier has a transport number for ions of one sign substantially greater than that of the above mentioned solutions and of the other barrier in said pair. Said substantially selective barriers alternate in the array with said less selective barriers. Solutions of electrolyte(s) are introduced into the spaces between the barriers and between the electrodes and their adjacent barriers. A substantially direct current electric potential is applied between the electrodes causing electrolyte to be transferred from every other space to the intervening spaces. Electrolyte enriched solution is withdrawn from the latter spaces and electorlyte depleted solution from the former.

In practice charged colloids or high molecular weight molecules (such as proteins) are driven by the direct current electric potential toward at least one of the barriers at which they may form highly viscous films which interfere with convective and diffusive electrolyte transfer to the barrier. Such colloids and high molecular weight molecules may also form more or less insoluble coagulum or precipitates on or within the surface of the barrier, which also interfere with electrolyte transfer and/or affect the physical integrity of the barrier.

Such phenomena are encountered for example during the electrodialysis of cheese whey concentrates, a popular application of electrodialysis; during the electrodialysis of other protein solutions; during the electrodialytic desalting of primary, secondary and even tertiary treated sewage effluent; and during the electrodialytic desalting of surface waters. Such undesirable effects may be alleviated by a combination of: high fluid shear at the affected surface of the barrier; symmetric, periodic reversal of the direction of the direct current potential; and/or periodic cleaning of the affected barrier in situ.

When barriers having a substantial anion transport number are used for electrodialytic desalting which barriers have a significant number of weakly basic amine groups near the interface with the space which is being depleted or when said interface has sorbed or deposited materials which interfere with convective and/or diffusive transport of electrolyte to the barrier interface and/or which catalyze the dissociation of water into hydronium cations and hydroxide anions, then at appreciable current densities a significant fraction of electric current passing through the barrier may be carried by hydroxide anions.

As a result the pH may become quite high at the interface between such barrier and the space being electrolytically enriched.

Electrolytes (e.g. calcium bicarbonate) which are not appreciably soluable at high pH's may then precipitate at or in such interface. Even in the absence of pH changes the solubility of some electrolytes (e.g. calcium sulfate) may be exceeded in the enriching space, resulting in deposits on the barrier.

These solubility and pH effects may be alleviated by a combination of: chemical additions to the enriching space (e.g. sodium hexa metaphosphate or acid resp.); high fluid shear at the affected surface of the barrier; symmetric, periodic reversal of the direction of the electric current potential and/or periodic cleaning of the affected surface in situ.

It has now been found that the above mentioned depositions on the electrolytically conducting barriers of electrodialysis can be substantially decreased by including in the depleting space a plurality of fluid permeable tubules. It is an object of the present invention to substantially reduce depositions on the barriers of electrodialysis apparatus by including in the depleting spaces of such apparatus a plurality of fluid permeable tubules and feeding to the lumen of such tubules an appropriate fluid, for example, at least part of the feed intended for the depleting space with at least part of such fluid passing through the walls of the tubules into the depleting space(s).

These and other objects will become apparent from the following description of the invention.

2. Description of the Prior Art:

U.S. Pat. No. 3,784,460 issued Jan. 8, 1974 describes an apparatus for treating an electrodeposition bath which comprises in combination an electrodeposition bath tank, an electrodialysis compartment dividing the electrodeposition bath tank into a coating zone and a counterelectrode compartment by a single electrolytically conducting barrier and a reverse osmosis or ultrafiltration unit external to the electrodeposition bath tank. The electrodialysis compartment supplies substantially direct current from a counterelectrode to the electrodepositing working electrode while simultaneously removing part of the counterions from the electrodepositing bath. The reverse osmosis or ultrafiltration unit external to the electrodeposition bath tank removes respectively, water and low molecule weight solutes from the electrodeposition bath. The reverse osmosis or ultrafiltration unit is not within the electric field of the electrodialysis/electrodeposition apparatus or between any pair of membranes in such apparatus. There is no synergistic relationship between the electrodialysis compartment and the reverse osmosis or ultrafiltration unit. The overall apparatus is a mere agglomeration of an electrodialysis/electrodeposition unit with a reverse osmosis or ultrafiltration unit which could be entirely decoupled and separated from each other by a great distance. As a consequence, the verse osmosis/ultrafiltration unit does not affect the performance of the electrodialysis cell.

U.S. Pat. No. 3,905,886 issued Sept. 16, 1975 describes a combination electrodialysis and ultrafiltration cell pack having planar ultrafiltration membranes interposed between a pair of planar ion selective membranes. A solution (such as cheese whey) to be concentrated and demineralized is fed under pressure to one side of the ultrafiltration membrane and a substantially direct current electric field is applied across the cell pack. Ions of one polarity pass through a first ion-selective membrane (e.g. a cation selective membrane) adjacent the feed cell while oppositely charged ions (resp. anions) penetrate the ultrafiltration membrane together with the ultrafiltration permeate. Finally the latter ions penetrate the other ion-selective membranes (resp. anion selective). Three process streams exit the system: in the case of cheese whey a protein concentrated, partially demineralized feed solution; a partially demineralized substantially protein free, lactose bearing permeate and a substantially protein-free, lactose-free stream containing the electrolytes removed from the other two streams. The apparatus is not practical however since a substantial pressure (up to several bars) must be applied across the ultrafiltration membrane to achieve ultrafiltration flux rates commensurate with economic electrodialysis production rates (20 to 200 gals/ft day). The substantially hydraulically impermeable ion selective membrane which forms the second wall of the feed cell is subjected to the same pressure and is therefore forced toward the other ion-selective membrane which sees only low pressure, requiring special structure in the space between the ion-selective membranes. It is common practice in the design of electrodialysis apparatus to have substantially no pressure difference from one side of an ion selective membrane to the other in order to minimize crossleak (e.g. of protein and lactose) from an electrolyte depleting space to an electrolyte enriching space. The high pressure differentials required for the ultrafiltration membrane in the apparatus of U.S. Pat. No. 3,905,886 make the control of cross-leaks extremely difficult. Further the high pressures make it necessary to use a very much more massive mechanism to close the cell pack and prevent leaks to the outside. For example in a typical apparatus having an active area of about 3000 cm2 and using a pressure differential of 3 bars to drive the ultrafiltration membrane the extra force on the closure mechanism is about 9 tonnes.

U.S. Pat. Nos. 4,043,896 issued Aug. 23, 1977 and 4,123,342 issued Oct. 31, 1978 are similar to U.S. Pat. No. 3,905,886 described above except that either the anion-selective or the cation-selective membrane is replaced with a substantially non-selective membrane. The apparatus described suffers from the same practical problems as that of U.S. Pat. No. 3,905,886.

All of the prior art apparatuses summarized above either suffer from high costs associated with the problem of handling the high pressures applied to both the ultrafiltration and electrodialysis membranes or do not substantially protect the electrodialysis membranes from deposits.

It is therefore a further objective of this invention to provide apparatus and processes having lower cost, which apparatus and processes do substantially protect the electrodialysis barriers from deposits and in which the membrane filtration/ultrafiltration/reverse osmosis driving forces are not applied to the electrodialysis barriers.

These and other objectives will become clear from the following brief description of the drawings and description of preferred embodiments.

DESCRIPTION OF PREFERRED EMBODIMENTS

In its broadest aspect, the present invention comprises apparatuses and processes for transferring electrolytes from one electrolytically conducting solution to another, the apparatus comprising: a pair of spaced electrodes; at least one pair of spaced electrolytically conducting barriers between the electrodes, one of the barriers of the pair having a transport number for ions of one sign substantially greater than that of the solutions and of the other barrier in the pair; means for applying a substantially direct current electrical potential between the electrodes in a direction to cause electrolyte to be transferred out of the space between the pair of barriers; and a plurality of fluid permeable tubules between the barriers of said pair. There are in addition means for introducing fluid into at least one end of the tubules and means for withdrawing fluid from the space between the barriers.

Figure 1:
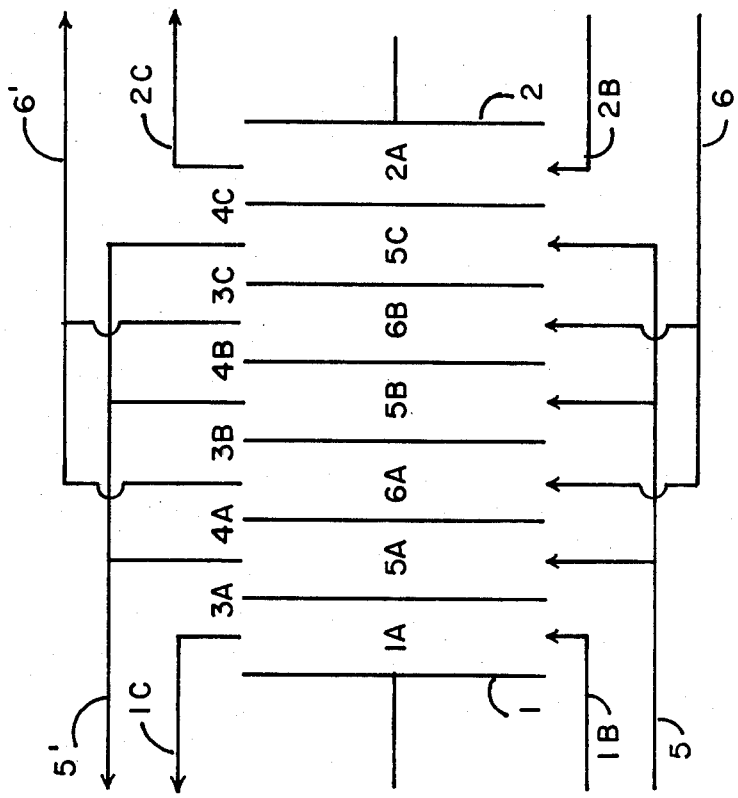
FIG. 1 is a schematic representation of a conventional electrodialysis apparatus for transferring electrolytes from one electrolytically conducting solution to another, comprising a pair of spaced electrodes, at least one pair of spaced electrolytically conducting barriers between the electrodes, one of the barriers in the pair having a transport number for ions of one sign substantially greater than that of the solutions and of the other barrier.

Referring to FIG. 1 there is indicated a conventional electrodialysis apparatus comprising a pair of spaced electrodes 1 and 2; three pairs of spaced electrolytically conducting barriers (3a and 4a, 3b and 4b, 3c and 4c). One of the barriers in each pair (say 3a, 3b, 3c) has a transport number for ions of one sign substantially greater than that of the solutions and of the other barrier (resp. 4a, 4b, 4c) in the pair. The difference in ion transport number between the barriers 3a, 3b, 3c and the barriers 4a, 4b, 4c defines two classes of spaces between the barriers: one class (5a, 5b, 5c) alternates with the other (6a, 6b). Although only three pairs of barriers are represented in FIG. 1 it is typical to have 100 or more pairs spaced between a single pair of spaced electrodes 1 and 2. There would then obviously be 100 or more spaces of the type 5a, 5b, 5c alternating with spaces of the type 6a, 6b. Also represented in FIG. 1 are: means 5 for introducing fluid into spaces 5a, 5b, 5c and means 5′ for withdrawing fluid from said spaces;

means 6 for introducing fluid into spaces 6a, 6b and means 6′ for withdrawing fluid from said spaces;

means 1b and 2b for introducing fluids resp. into the spaces 1a and 2a between the electrode 1 and the adjacent barrier 3a and between the electrode 2 and the adjacent barrier 4c;

means 1c and 2c for withdrawing fluid from spaces 1a and 2a resp.

By way of illustration the apparatus of FIG. 1 will be described with respect to the partial deionization of sweet, cheese whey. In such case typically the barriers 3a, 3b and 3c are selective for positively charged ions and the barriers 4a, 4b and 4c selective for negatively charged ions or not selective. Cheese whey is typically concentrated by low temperature evaporation or reverse osmosis to solids concentrations of about 20 percent and particulate matter removed by centrifugation, cross-flow filtration or other suitable means. The thus pretreated whey may, for example, be continuously introduced by means 5 into spaces 5a, 5b, 5c and continuously withdrawn by means 5′. A suitable receiving solution is also introduced simultaneously and continuously by means 6 into spaces 6a and 6b and withdrawn by means 6′. Further suitable solutions will be introduced by means 1b and 2b into spaces 1a and 2a and withdrawn by means 1c and 2c resp. If barriers 3a, 3b, 3c are cation selective then electrode 1 will have a negative direct current electrical potential applied and electrode 2 a positive direct current potential.

For purposes of this illustration, the composition of concentrated cheese whey is assumed to be about (in parts per million):
Fat: 1,400
"Protein" (N times 6.38): 26,000
Lactose Monohydrate: 148,000
Sodium: 1,600
Potassium: 3,800
Calcium: 1,500
Magnesium: 180
Phosphorus: 1,100
Chloride: 3,200
Citrate: 4,000
pH: 6.4

Under the direct current electrical potential, positively charged ions such as sodium, potassium, calcium and magnesium will transfer through barriers 3a, 3b, 3c into spaces 1a, 6a, 6b resp. and negatively charged ions such as phosphate, chloride and citrate will transfer through barriers 4a, 4b, 4c into spaces 6a, 6b, 2a resp.

"Protein" as listed above comprises lactalbumin, lactoglobulin, residual casein, polypeptides and amino acids. Any of the latter which are positively charged will migrate under the influence of the direct current potential to the interface between barriers 3a, 3b, 3c and spaces 5a, 5b, 5c depositing thereon initially at least as mucilaginous films. These lead to increased electrical and hydraulic resistance. Under the conditions exisiting during electrodialysis the proteins in the films may eventually partially coagulate.

The transport number of barriers 3a, 3b, 3c for positive ions is typically in the range 0.85 to 0.95 (that is about 85 to about 95 percent of the electric current passing through barriers 3a, 3b, 3c is carried by positive ions, the remainder by negative ions). In contrast, in the spaces 5a, 5b, 5c occupied by cheese whey concentrate the transport number for positive ions is only about 0.4 to 0.5. It is believed that the difference (roughly 50 percent of the positive ions passing through barriers 3a, 3b, 3c) is supplied by diffusion and convection of positive ions from the interior of spaces 5a, 5b, 5c to the barriers 3a, 3b, 3c. The films of "proteins" on the barriers are believed to interfere with such diffusion and convection. Eventually the interfaces between barriers 3a, 3b, 3c and spaces 5a, 5b, 5c become substantially depleted of electrolyte and it is believed that the electrical resistance of a very thin layer (perhaps about 0.02 micrometers) at the interface can become very high resulting in potential gradients in such layer of hundreds of thousands of volts per centimeter. It is believed by some authorities that in the presence of such gradients the decomposition of water into positively charged hydrogen ions and negatively charged hydroxide ions is catalyzed by the free amino and/or carboxylic acid groups in the protein film resulting in the transport of such hydrogen ions into spaces 1a, 6a, 6b and such hydroxide ions into spaces 5a, 5b, 5c. It is believed also that such potential gradients result in compaction of the protein film immediately adjacent to the barriers.

On the other hand any portion of the "protein" which is negatively charged will migrate under the influence of the direct current potential to the interface between barriers 4a, 4b, 4c and spaces 5a, 5b, 5c, also depositing thereon. These deposits (perhaps eventually partially coagulating) also lead to increased electrical and hydraulic resistance, even if the barriers 4a, 4b, 4c do not have ion transport numbers significantly different from those in spaces 5a, 5b, 5c. However, as is typically the case, the barriers 4a, 4b, 4c may be selective for negatively charged ions in which case the transport number of such barriers for negative ions is typically in the range 0.85 to 0.95 (that is, the transport number for positive ions is in the range 0.05 to 0.15). In the spaces 5a, 5b, 5c the transport number for negative ions is only about 0.5 to 0.6. It is believed that the difference (roughly 40 percent of the negative ions passing through barriers 4a, 4b, 4c) is supplied by diffusion and convection of negative ions from the interior of spaces 5a, 5b, 5c to the barriers 4a, 4b, 4c. The films of "proteins" on the barriers are believed to interfere with such diffusion and convection. Eventually the interfaces between barriers 4a, 4b, 4c and spaces 5a, 5b, 5c become substantially depleted of electrolyte and it is also believed that the electrical resistance of a very thin layer (perhaps about 0.02 micrometers) at the interface can become very high resulting in potential gradients in such layer of hundreds of thousands of volts per centimeter. Again it is hypothesized that in the presence of such gradients the decomposition of water into positively charged hydrogen ions and negatively charged hydroxide ions may be catalyzed by the free amino and/or carboxylic acid groups in the protein film (and-/or by primary, secondary and/or tertiary amino groups in the barriers at the interface), resulting in the transport of such hydroxide ions into spaces 6a, 6b, 2a and such hydrogen ions into spaces 5a, 5b, 5c. It is also hypothesized that such potential gradients result in compaction of the protein film immediately adjacent to the barriers.

The situation at such latter interfaces is in principle worse than that described in connection with barriers 3a, 3b, 3c. Hydroxide ions from the dissociation of water passing through barriers 4a, 4b, 4c can result in the precipitation of calcium salts insoluble at high pH's at or within the interface of barriers 4a, 4b, 4c with the spaces 6a, 6b, 2a unless the solutions in such spaces have been acidified. Further hydrogen ions passing through the "protein" films on barriers 4a, 4b, 4c will tend further to coagulate and densify the films.

Typically after several hours of electrodialysis, the phenomena referred to above have become so severe that it is economic to stop the electrodialysis and wash the apparatus with dilute caustic, enzymes or other solutions capable of solubilizing the deposited "proteins". Such cleaning-in-place is effective but involves among other things the loss of operating time and the production of waste streams having high biochemical oxygen demand. Alternatively the direction of the electric current can be reversed periodically inducing proteins from the barrier interfaces to migrate back into the interior of spaces 5a, 5b, 5c. Unfortunately such migration is slow and is necessarily accompanied by transfer of electrolyte from spaces 1a, 6a, 6b into spaces 5a, 5b, 5c under the influence of the reversed electric potential. Hence it is customary during such reversal to introduce the whey concentrate through means 6 into spaces 6a, 6b and an appropriate receiving solution through means 5 into spaces 5a, 5b, 5c. For such total inversion to be reasonably effective i.e. to avoid irreversible deposition of "protein", it is necessary for the reversal to take place at least once an hour if not more often resulting in the production of wastes containing substantial biochemical oxygen demand from whey remaining in whey spaces when they are inverted to spaces containing receiving solution.

U.S. Pats. Nos. 3,905,886; 4,043,896; and 4,123,342 have attempted to ameliorate the above phenomena by interposing planar ultrafiltration membranes in spaces 5a, 5b, 5c between barriers 3a, 3b, 3c on the one hand and barriers 4a, 4b, 4c on the other, all as described above. Unfortunately, the pressures required to drive the ultrafiltration membranes introduce other problems and as a result the resulting apparatus has not achieved commercial acceptance.

Although the state-of-the-art has been described with respect to partial deionization of cheese whey concentrates it will be understood by those skilled-in-the-art that similar problems are encountered with other solutions, e.g.: delactosed whey; cane or beet sugar juice or molasses; sulfite pulping liquor; whole blood or blood plasma and other protein solutions of medical and/or pharmaceutical interest; primary, secondary or even tertiary sewage effluents; brackish surface waters containing colloidal matter and many other solutions containing colloidal matter. Even in the case of brackish water having substantially no colloidal matter precipitates of calcium carbonate and/or calcium sulfate can be deposited on or in the interface between a barrier selective to negative ions and the adjacent enriching stream.

It has now been found that these and other troublesome phenomena which occur during electrodialysis of many solutions may be substantially ameliorated if not eliminated by including between the barriers defining the depleting space a plurality of fluid permeable tubules. The invention will be described with respect to FIG. 2 in which 8 represents a bundle, layer or other body of fluid permeable tubules embedded in tube sheets 9a and 9b at least at one end, said body being positioned in a cavity in the frame or gasket 12. Plenums 7A and 7B communicate with the ends of the tubules and with conduits 10A and 10B. Conduits 11A and 11B communicate with the exterior of the tubules. It will be understood that in some modes of operation not all of conduits 10A, 10B, 11A and 11B may be needed and/or provided.

In one embodiment of this invention the tubules 8 comprise a single layer of juxtaposed ultrafiltration hollow fibers having external diameters marginally less than the thickness of the gasket or frame 12. Such frame may, for example, occupy the spaces 5a, 5b, 5c of FIG. 1. Solution which is to be partially deionized is forced into the lumen of the tubules, for example through conduit 10A and chamber 7A under sufficient pressure to cause a portion of the solution to permeate the walls of the tubules into spaces 5a, 5b, 5c. The material of the tubules is selected to retain at least part of any colloidal matter in the solution. The portion of the solution which is retained exits the apparatus, for example through chamber 7B and conduit 10B. The velocity of solution within the bores of the tubules is preferably selected to provide sufficient shear at the interior walls of the bores to inhibit build-up of films of colloidal matter. Upon the application of a direct current potential to the apparatus of FIG. 1 containing the tubules of FIG. 2, the solution permeating the walls of the tubules into spaces 5a, 5b, 5c is partially deionized and exits the apparatus, for example through conduit 11A. If it is desired to increase the diffusion and convection of electrolyte to the barriers 3a, 3b, 3c and 4a, 4b, 4c (for example in order to sustain higher electrical current without substantial dissociation of water) then part of the effluent from conduct 11A may be recycled and re-enter the apparatus through conduit 11B.

Figure 2:
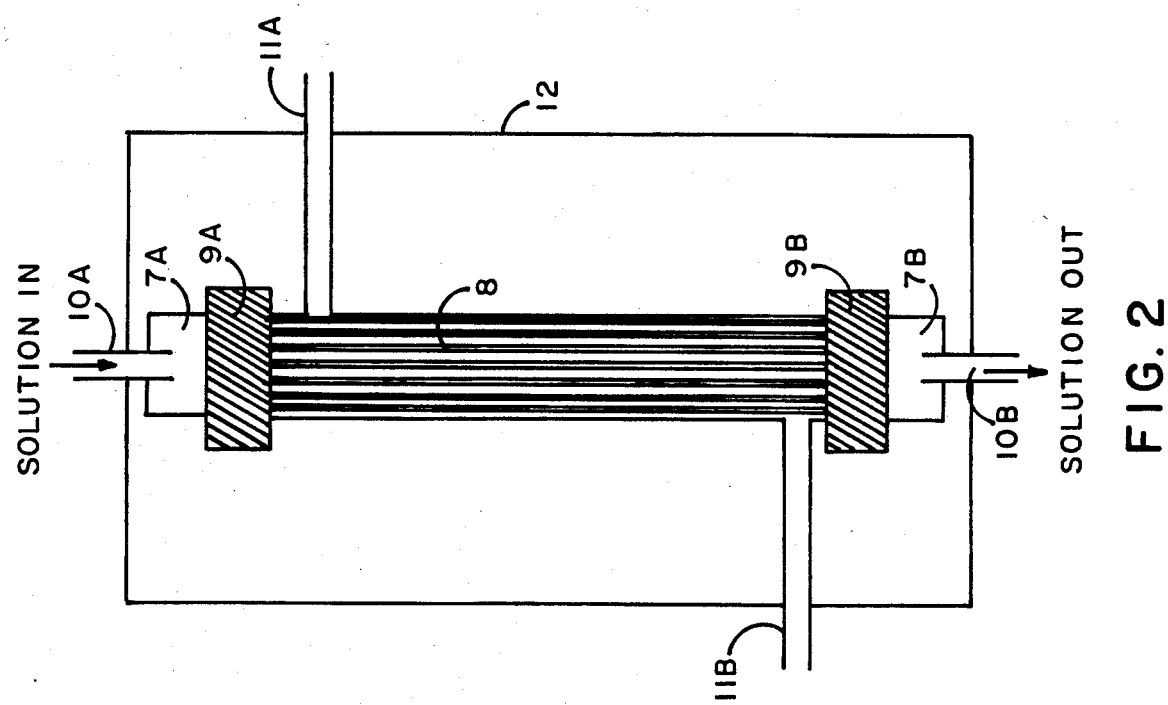
FIG. 2 is a schematic representation of one embodiment of a spacer in accordance with this invention suitable for occupying the space between a pair of barriers in the apparatus of FIG. 1 and comprising a plurality of fluid permeable tubules.

It is found that if the tubules of FIG. 2 are juxtaposed to the barriers of FIG. 1 (for example within a distance of 0.005 cm) then the flux of permeate through the tubule walls significantly improves diffusion and convection of electrolyte to the barrier interfaces. It will be understood that one may take advantage of such improved diffusion and convection also in cases in which the solutions to be deionized contain little or no colloids. In such cases the pressure required to cause high flux through the walls of the tubules can be quite low. Alternatively air or other suitable gas can be forced through the walls of the tubules resulting in significant improvement of diffusion and convection of electrolyte to the barriers.

As compared to the prior art apparatus of U.S. Pats. Nos. 3,905,886; 4,043,896; and 4,123,342, the pressure required to force fluid through the walls of the tubules is completely contained within the tubules and not experienced by the barriers of the electrodialysis apparatus. This feature permits the tubules to be fabricated from any material commonly used in membrane filtration, ultrafiltration or even reverse osmosis. With respect to the latter it is particularly advantageous to utilize so-called low pressure reverse osmosis tubules which have a relatively high screening factor for non-monovalent ions and a relatively low screening factor for monovalent ions. In such case the partial pre-softening of the solution greatly reduces the danger of deposits of poorly soluble electrolytes, for example calcium carbonate or calcium sulfate even under electrodialysis operating conditions which would ordinarily result in such deposits.

Although the inventon has been described in terms of a single layer of tubules it will be obvious to those skilled in the art that many other configurations are possible and advantageous. For example multiple layers or bundles of tubules may be folded one or more times within the cavity of frame 12 of FIG. 2. It will be obvious to those skilled in the art that if the bundle is folded an odd number of times then the chambers 7A and 7B and the conduits 10A and 10B will be at the same end of the apparatus. It will also be obvious that configurations which significantly reduce diffusion and convection of electrolyte to the electrodialysis barriers will generally not be desirable.

Although the apparatus of FIG. 1 has been described in terms of planar barriers and electrodes (e.g. similar to a plate heat exchanger) other configurations are contemplated within the scope of this invention and will be obvious to those skilled in the art. Particularly advantageous is a spiral wound configuration of the electrodialysis barriers in which case the tubules may follow the spiral of the barriers or be parallel to the central axis of the spiral.

For the sake of clarity the apparatus of FIG. 2 has been described in terms of separate tube sheets terminating the tubules. It will be understood however that it may be advantageous for such tube sheets to be an integral part of the frame/gasket 12.

The apparatus of FIG. 1 containing the tubules of FIG. 2 may be advantageously operated as a reversing type electrodialysis apparatus. If the reversal is substantially symmetric, for example, if the spaces 5a, 5b, 5c are the depleting spaces for a major fraction of the operating time then the tubules may be inserted only in such spaces. On the other hand if the reversal is substantially symmetric then it will generally be advantageous to have the tubules in both the enriching and depleting spaces. In such case the pressure in the bores of the tubules in the enriching spaces may be advantageously reduced (compared to the pressure in the enriching spaces), for example by applying a partial vacuum, thereby permitting at least part of the fluid in the enriching space to permeate into the tubule bores exiting through one or both conduits 10a and 10b resulting in a useful cleansing of the interior surfaces of the tubules.

EXAMPLE 1

An electrodialysis apparatus is constructed in accordance with this invention. Each depletion space has internal dimensions of about 9.3 by 2.9 cm and is about 0.15 cm thick. Twenty-six polysulfone ultrafiltration tubules are mounted in each depletion space, parallel to the long axis of the space. The tubules are each about 9.3 cm long and have external diameters of about 0.1 cm and internal diameters of about 0.05 cm. The barriers are AR 103CZL anion selective membranes and CR 61QZL cation selective membranes available from Ionics, Inc., Watertown, Mass.

Natural, sweet, cheddar whey is recirculated thorugh the bores of the tubules at an inlet pressure of about 1.7 bars. A solution containing about 5 grams/liter of sodium chloride is circulated through each enriching space. After a few minutes to allow the depleting spaces to become filled with permeate from the tubules, a direct electric current of about ⅛th ampere is applied. It is found that the effluent from the depletion spaces is about 50 percent deionized and contains lactose. The apparatus is dis-assembled and the ion selective membrane barriers are found to be substantially free of protein.

EXAMPLE 2

The experiment of Example 1 is repeated except both enriching and depleting spaces contain the tubules as described. A partial vacuum is applied to the tubules of the enriching spaces to induce part of the flow through the enriching spaces to exit through the bores of the tubules. After about an hour of operation the electric current and the flows of liquid are stopped and the apparatus washed with water. Whey is then recirculated through the bores of the tubules in the former enriching spaces at an inlet pressure of about 1.7 bars and a solution containing about 5 grams/liter of sodium chloride is circulated through each former depletion space. After a few minutes to allow the new depletion spaces to become filled with permeate from the tubules, a direct electric current of about ⅛th ampere is applied in the direction opposite to that in the first part of this example. A partial vacuum is applied to the bores of the tubules of the new enriching spaces to induce part of the flow through such spaces to exit through the bores of the tubules. It is found that the effluent from the new depletion spaces is about 50 percent deionized and contains lactose.

The reversal/inversion procedure as described above is repeated after about an hour, that is the operation is returned to that of the first part of the example. After about another hour of operation in such obverse direction the apparatus is dis-assembled and the membranes are found to be substantially free of protein.

EXAMPLE 3

The apparatus of Example 2 is used partially to deionize a secondary sewage effluent which has been sterilized by chlorination and filtered through a mixed media filter. The pre-treated effluent is recirculated at a pressure of about 1.7 bars to the bores of the tubules in the depletion spaces. It is also recirculated through the enriching spaces external to the tubules. Filtered air is fed to the bores of the tubules in the enriching spaces at sufficient pressure to permit some to permeate the tubules into the enriching space. After several minutes, to permit the depletion spaces external to the tubules to become filled with liquid, a direct current is applied sufficient to achieve about 50 percent deionization of the effluent from the depletion spaces compared to the feed to the tubules. After about an hour the accumulated effluent from the depletion spaces is recirculated through the depletion spaces external to the tubules. After about another hour of operation the apparatus is dis-assembled and the membranes are found to be substantially free of deposits.

EXAMPLE 4

An apparatus is assembled in accordance with Example 2. Platinized platinum voltage probes are inserted in the electrode spaces. The tubules are low pressure reverse osmosis tubules having a calcium rejection of about 90 percent. Water containing about 500 mg/l $CaCl_2$, 250 mg/l $NaHCO_3$ and 250 mg/l $Na_2SO_4$ is recirculated through the bores of the tubules in the depletion spaces at an entrance pressure of about 5 bars. It is also recirculated through both the bores of the tubules in the enriching space and through the enriching space external to the tubules, the pressures in this case being adjusted to produce substantially no net flow of liquid in either direction through the walls of the tubules. The apparatus is operated without current until sufficient effluent from the depletion spaces has been accumulated to permit recirculation of such effluent through the depletion spaces external to the tubules. A direct current potential is applied and controlled to be equal to about 0.5 volts for each barrier between the voltage probes as measured by a high impedance voltmeter. The effluent from the depleting spaces slowly approaches steady state corresponding to substantial deionization of the feed to the tubules. The operation is terminated and the apparatus disassembled. It is found that the membranes are substantially free of deposits.

EXAMPLE 5

The experiment of Example 3 is repeated except platinized platinum voltage probes are inserted in the electrode spaces and the chlorinated, filtered secondary effluent is recirculated in two independent streams through the depleting spaces on the one hand and the enriching spaces on the other, in each case external to the tubules. Filtered air is fed to the bores of the tubules in both the enriching and depleting spaces at sufficient pressure to produce an effluent from each class of space comprising about 50 percent air, 50 percent liquid by volume. A direct current potential is applied and controlled to be equal to about 0.5 volts for each barrier between the voltage probes as measured by a high impedance voltmeter. After several hours the operation is discontinued and the apparatus disassembled. It is found that the barriers are substantially free of deposits.

EXAMPLE 6

An apparatus in constructed in accordance with Example 1. Plantinized platinum voltage probes are inserted in the electrical spaces. Water is recirculated through the enriching and depletion spaces. A synthetic flue gas comprising about 3 percent sulfur dioxide and 97 percent air is forced through the bores of the tubules in the depletion spaces at a rate sufficient to produce an effluent from the depletion spaces about 50 percent air, 50 percent liquid by volume. A direct current potential is applied between the electrodes and is controlled to produce a potential of about 1 volt for each membrane between the voltage probes as measured at the probes by a high impedance voltmeter. It is found that sulfur dioxide is transferred to the enriching spaces.

While the invention has been herein shown and described in what is presently conceived to be the most practical and preferred embodiments thereof, it will be apparent to those of ordinary shill in the art that many modifications may be made thereof whithin the scope of the invention, which scope is to be accorded the broadest interpretation of the appended claims so as to encompass all equivalent assemblies and methods.

What is claimed is:

1. Apparatus for transferring electrolytes from one electrolytically conducting solution to another, said apparatus comprising:
   (a) a pair of spaced electrodes;
   (b) at least one pair of spaced electrolytically conducting barriers between said electrodes, one of said barriers having a transport number of ions of one sign substantially greater than that of said solutions and of the other barrier;
   (c) a plurality of fluid permeable tubules between said barriers;
   (d) means for introducing fluid into at least one end of such tubules;
   (e) means for applying a substantially direct current electrical potential between said electrodes in a direction to cause electrolyte to be transferred out of the space between said barriers; and
   (f) means for withdrawing fluid from the space between said barriers.

2. Apparatus according to claim 1 in which said one of said barriers is a cation selective membrane and said other barrier is selected from the group consisting of anion-selective membranes and substantially non-selective membranes.

3. Apparatus according to claim 1 in which said fluid permeable tubules are selected from the group consisting of membrane filtration, ultrafiltration and reverse osmosis tubules.

4. Apparatus according to claim 1 in which said means for applying a substantially direct current electrical potential comprises means for reversing the direction of the potential.

5. A process for transferring electrolytes from a first solution located in depletion spaces of an electrodialysis apparatus to a second solution located in enriching spaces of said apparatus, said depletion and enriching spaces being separated from each other by electrolytically conducting barriers, the process comprising:
   (a) introducing fluid under pressure into the bore of a fluid permeable tubule, said tubule being positioned in at least one of the depletion spaces of said apparatus to cause at least part of said introduced fluid to permeate said tubule and pass into said depletion space;
   (b) applying a substantially direct electric current to such apparatus to cause ions to migrate from said depletion space into said adjacently positioned enriching space; and
   (c) withdrawing at least part of said first solution from said depletion spaces.

6. A process according to claim 5 in which the fluid introduced into said tubule is at least part of said first solution.

7. A process according to claim 5 in which the direction of the direct electric current is subsequently reversed.

8. Apparatus for transferring electrolytes from a first solution to a second solution, said apparatus comprising:
   (a) a plurality of spaced electrolytically conducting barriers of a first kind, said barriers of a first kind having a transport number for ions of one sign substantially greater than that of said solutions, said barriers of a first kind being interspersed with spaced barriers of a second kind, said barriers of a second kind having a transport number for said ions of one sign substantially less than that of said barriers of a first kind, said barriers of a first kind and of a second kind defining depletion spaces and enrichment spaces therebetween;
   (b) a fluid permeable tubule in at least one of said defined spaces;
   (c) means for introducing fluid into said tubule;
   (d) means for applying a substantially direct electric current to cause ions to leave said depletion spaces; and
   (e) means for withdrawing fluid from said depletion spaces.

* * * * *